Jan. 16, 1968 W. C. HOCH 3,363,966
SYSTEM OF STEREOSCOPIC PHOTOGRAPHY
Original Filed Nov. 14, 1963 4 Sheets-Sheet 1

INVENTOR.
WINTON C. HOCH
BY
ATTORNEY

Jan. 16, 1968  W. C. HOCH  3,363,966
SYSTEM OF STEREOSCOPIC PHOTOGRAPHY
Original Filed Nov. 14, 1963  4 Sheets-Sheet 2
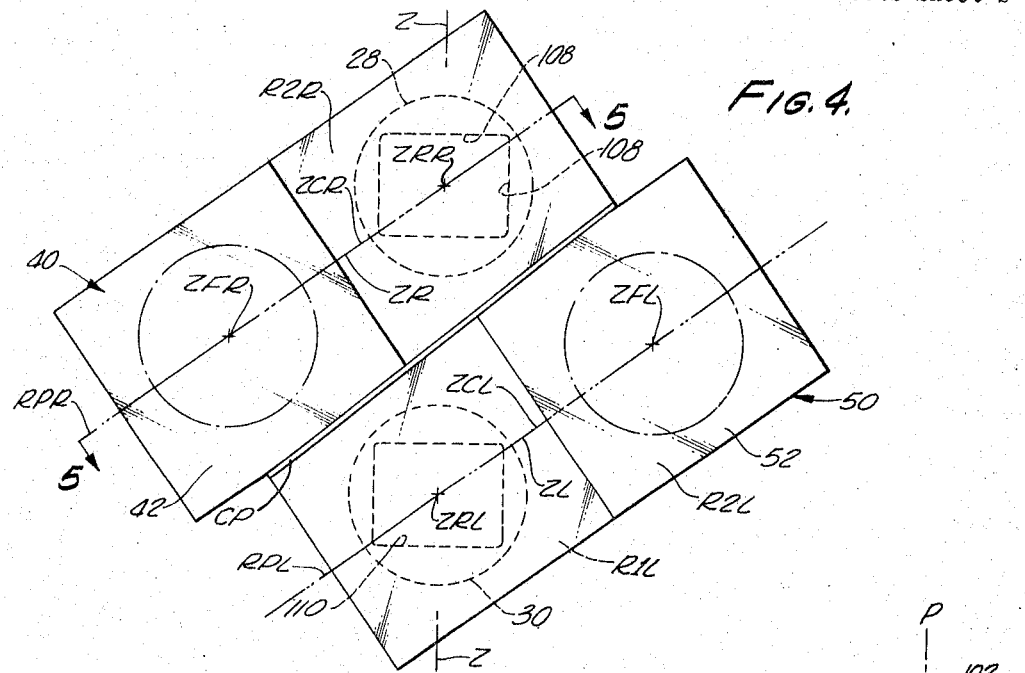
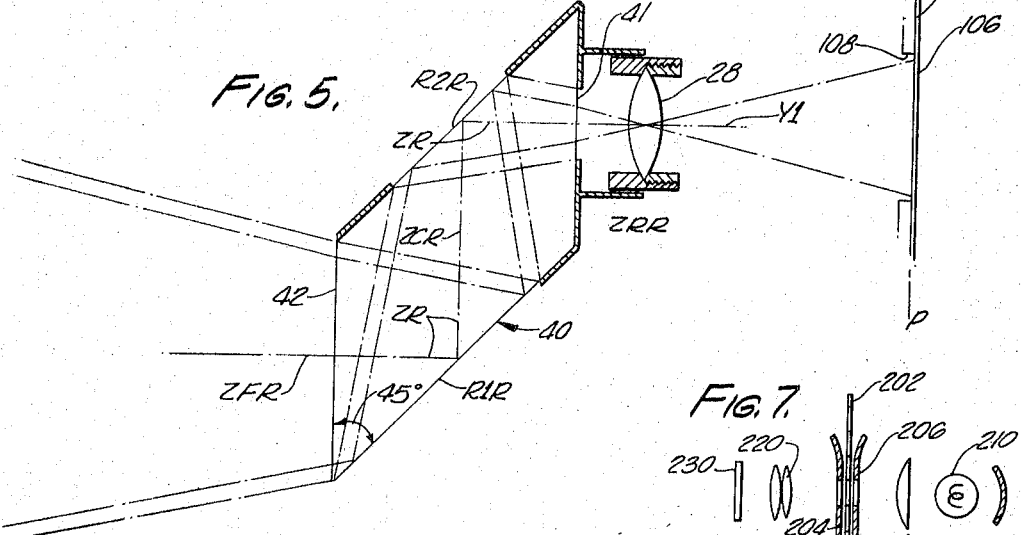
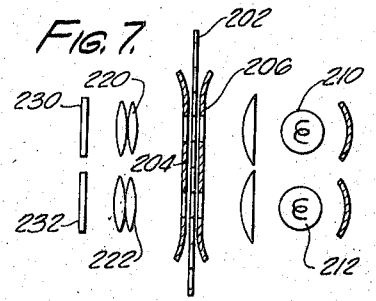
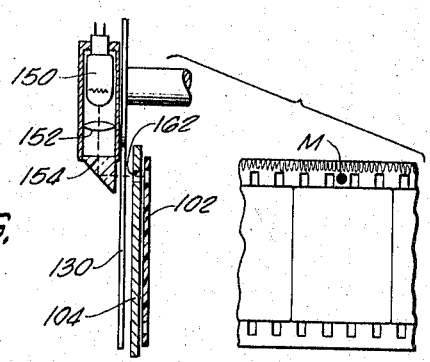
INVENTOR.
WINTON C. HOCH
BY Reed Lawler
ATTORNEY Jan. 16, 1968  W. C. HOCH  3,363,966
SYSTEM OF STEREOSCOPIC PHOTOGRAPHY
Original Filed Nov. 14, 1963  4 Sheets-Sheet 4

INVENTOR.
WINTON C. HOCH
BY
ATTORNEY 3,363,966
SYSTEM OF STEREOSCOPIC PHOTOGRAPHY
Winton C. Hoch, 1491 Stone Canyon Road,
Los Angeles, Calif. 90024
Continuation of application Ser. No. 323,807, Nov. 14,
1963. This application Nov. 25, 1966, Ser. No. 597,175
6 Claims. (Cl. 352—65)

ABSTRACT OF THE DISCLOSURE

In the stereoscopic camera of this invention two optical means are employed to direct right- and left-view images of a scene being photographed to a pair of apertures. The apertures are spaced apart vertically approximately an even number of frames but with the distance between their centers differing a few percent from an odd multiple of the normal interframe distance. With this arrangement, the spacing between centers of pairs of successive images on the film are alternately less than and alternately greater than the normal interframe distance. This facilitates proper registration of the images with right-view and left-view viewing devices in projection.

---

This invention relates in general to improvements in three-dimensional or stereoscopic photography and particularly to improvements in cameras for making three-dimensional or stereoscopic photographs and more particularly to improvements in stereoscopic motion picture cameras.

This application is a continuation of my prior patent application Ser. No. 323,807, filed Nov. 14, 1963, now abandoned.

While some of the features of this invention are applicable to still picture stereoscopy the invention will be described with particular reference to its application to motion picture stereoscopy.

The invention employs novel mechanical and optical arrangements which are of such a character that they can be readily incorporated in the design of motion picture cameras embodying many conventional design features and are applicable to all motion pictures of various sizes including those made with standard film and frame sizes.

One of the novel features of this invention involves the use of a film gate that is provided with a pair of picture apertures that are spaced apart vertically by a substantial distance to accommodate the needed optical and mechanical elements so that the same film is simultaneously exposed to the right-view image of a scene in one aperture and left-view image of the same scene in the other aperture. The film thus produced includes alternate series of right and left views of the scene being photographed. In the film produced in this invention corresponding stereo pairs are not adjacent to each other but are separated by an even number of frames in which members of other stereo pairs are photographed.

In this invention, two optical means are employed for projecting images of the right view and left view of the scene as viewed from two horizontally spaced apart points to the vertically spaced apart film apertures. In the best embodiment of the invention that is described herein, the two optical means are in the form of a pair of carefully matched rhomboid type prisms. Each of the prisms transmits light corresponding to one view of the stereoscopic pair to its respective corresponding aperture. The rear faces of the prisms are located one above the other opposite the apertures. The front faces are located in a horizontal plane on opposite sides of a central vertical plane of symmetry of the camera. Suitable lenses are employed for focusing images of the object field onto the film in a film plane behind the respective apertures. In this invention, the mechanism that is usually employed for advancing the film past the image of the scene one aperture at a time, is constructed to advance the film two apertures at a time.

One advantage of this prism arrangement lies in the fact that the prisms may be of larger cross-section than would be the case if the picture apertures were adjacent to each other, instead of spaced apart. The same advantages can be attached when other optical means are employed. Thus, with this arrangement, lenses having larger stops than otherwise can be employed and the light-gathering power of the optical system is thereby increased. With an interocular viewing distance of approximately 2.5 inches this invention facilitates the use of wide angle lenses. Another advantage of this invention resides in the fact that any necessary vignetting due to the physical construction, geometry and masking of the prisms or other optical means can be made symmetrical with respect to the stereo images.

In one embodiment of the invention the images are so spaced on the film that incorrect projection of non-corresponding images is immediately apparent and correctable with customary types of projector framing controls.

This invention provides a superior method and apparatus for accurately positioning a succession of the corresponding stereo image pairs on a common strip of film so that printing and processing and other handling variables do not disturb the satisfactory presentation of the stereo pictures for viewing. Since the use of only one camera and one projector is required for the corresponding stereo pairs the equipment and operating costs are minimized. In some applications an appreciable film economy is achieved without sacrificing film image area. A further advantage of the invention resides in the fact that it requires little deviation from normal operating procedures in photography, projection, and film processing. A further advantage lies in the utilization of a basically normal image orientation on the film.

The foregoing and other features and advantages of the invention will be understood by reference to the following description taken in connection with the accompanying drawings in which.

Figure 3:
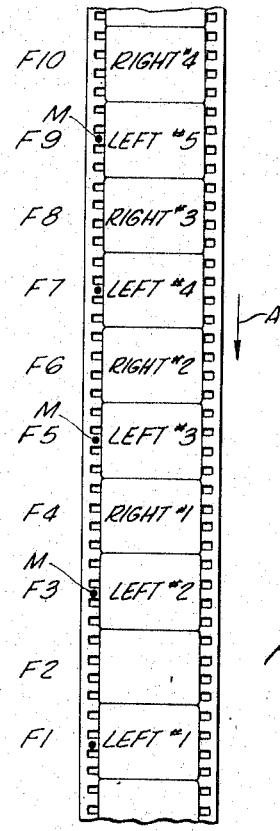
Figure 8:
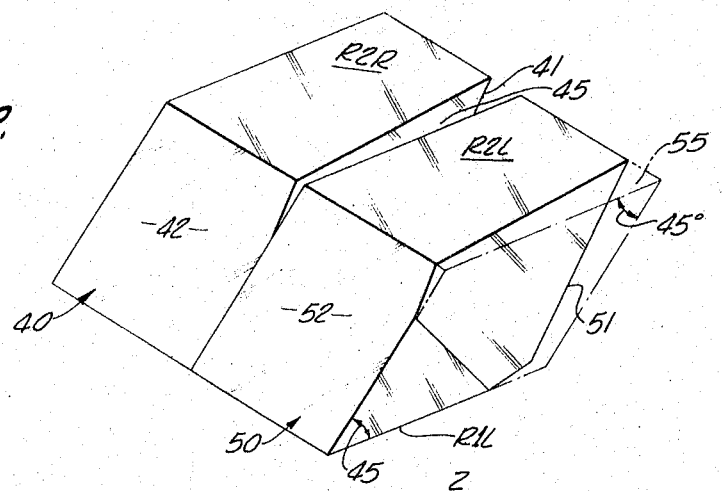
Figure 9:
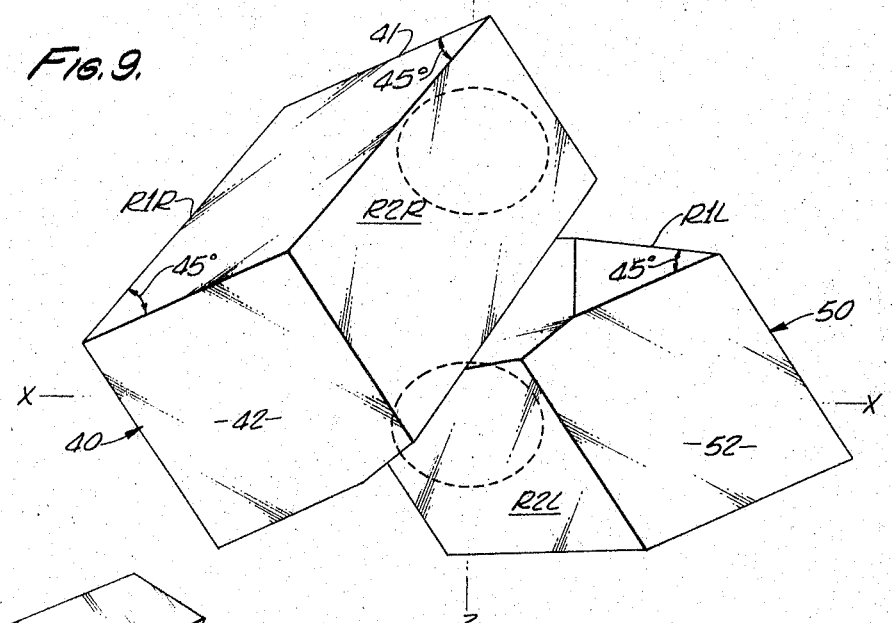
Figure 10:
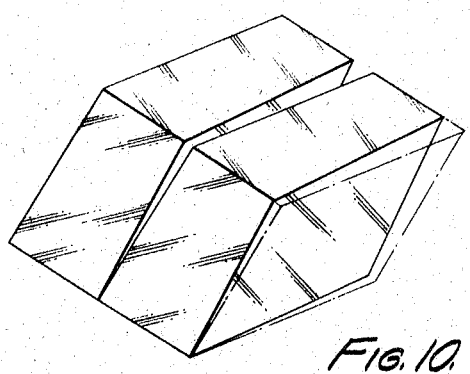
Figure 11:
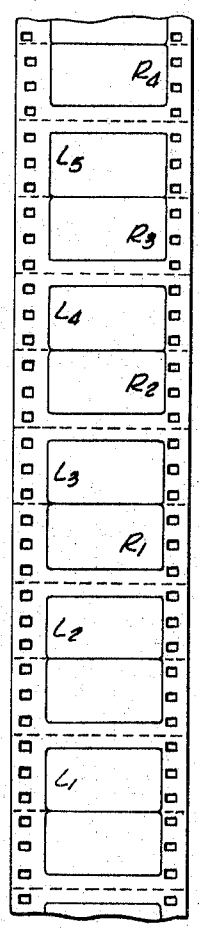
Figure 12:
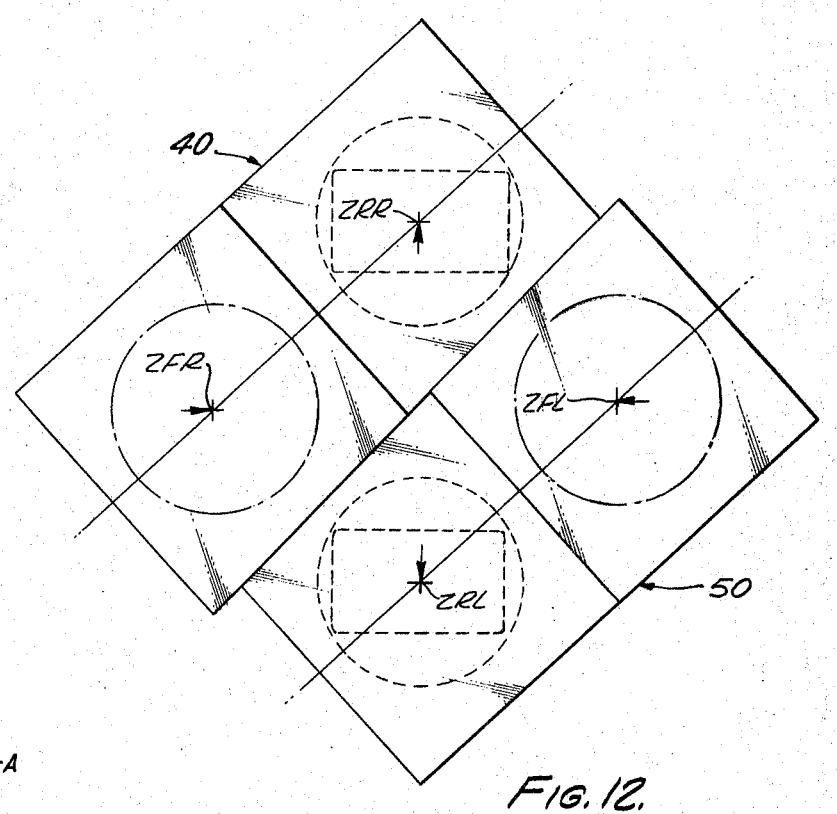

FIG. 3 presents a segment of film produced with this invention;

FIG. 4 is a front elevational view illustrating a prism arrangement;

FIG. 5 is a cross-sectional view on the line 5—5 of FIG. 4 illustrating how light is transmitted through a prism and lens to the film;

FIG. 6 is a schematic drawing illustrating how the film is marked to help identify right and left views;

FIG. 7 is a fragmentary schematic view of a projection system;

FIG. 8 is a perspective view of a rhomboid prism from which a pair of matched prisms are cut;

FIG. 9 is a perspective view of a pair of prisms as viewed downwardly from the front of the camera;

FIG. 10 is a view like that in FIG. 8 indicating how the prisms are cut from a single rhomboidal structure for use with a 16 mm. camera having a different image size;

FIG. 11 is a frontal outline of an alternative embodiment of the invention in which right and left views are photographed through apertures whose centers are offset slightly from the normal interframe distance; and FIG. 12 is a view of a film in which the right and left views are offset from the normal interframe spacing.

Figure 1:
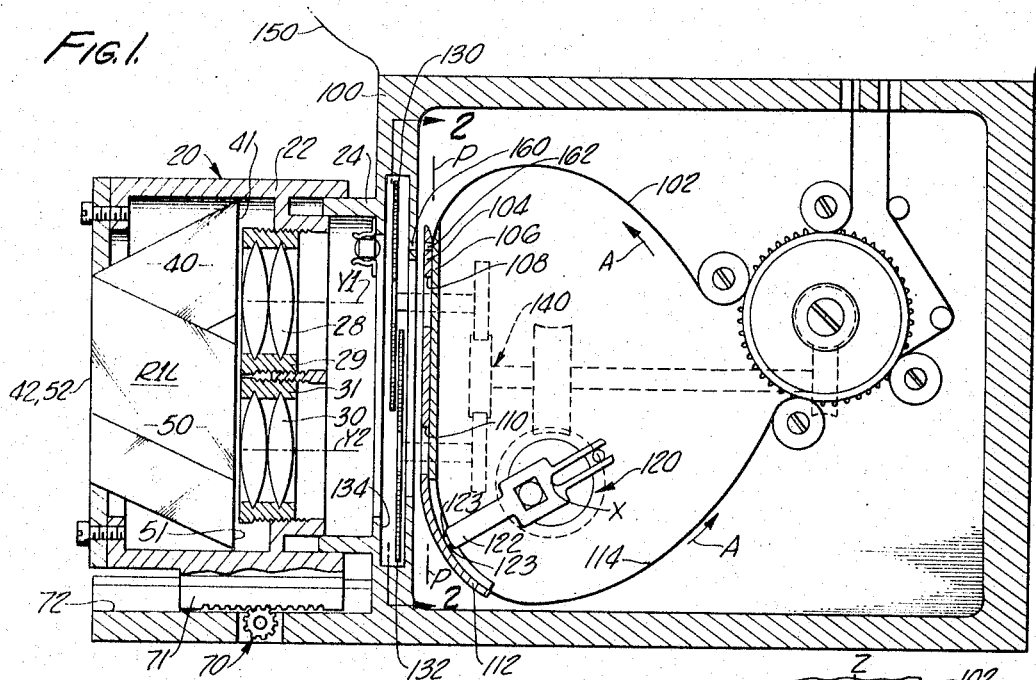
FIGURE 1 is a side vertical view, partly in cross-section, of a motion picture camera embodying one form of this invention.

Referring to the drawings and particularly to FIG. 1, there is shown a portion of a 35 mm. motion picture camera in which the invention has been incorporated. Various parts have been disclosed in sufficient detail to facilitate understanding of the invention, it being understood that many details shown could easily be varied without departing from the scope of the invention and many details not shown would ordinarily be incorporated in the design of a practical camera all in accordance with well known principles of the optical, photographic, and mechanical arts.

Figure 2:
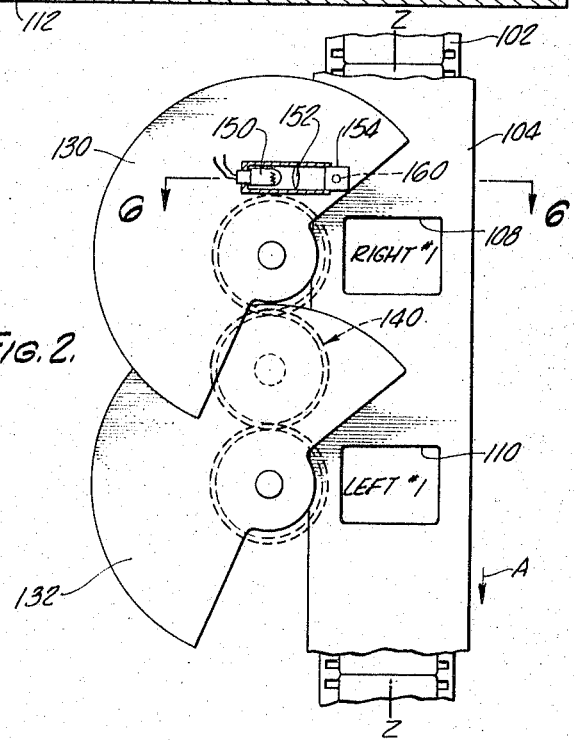
FIG. 2 is a front elevational view on the plane 2—2 of FIG. 1 illustrating parts of the camera including a specific shutter arrangement.

Though the camera may be employed in other positions, it will be described as though mounted in an upright position in which the film travels along a vertical axis in a film plane P—P (see FIG. 1) and in which the scene being photographed is viewed from the right side and from the left side of a vertical plane of symmetry Z—Z that intersects the film as indicated in FIGS. 2, 4, and 9.

The camera of FIG. 1 employs a special removable lens assembly 20 mounted on the front of a camera housing 100 through which motion picture film is advanced from and to a film magazine 150. This assembly includes two lenses 28 and 30 and two prisms 40 and 50. The invention resides primarily in the arrangement of the lenses and prisms in relation to a double apertured film gate that is provided adjacent the film plane and a double-frame film advancing mechanism.

The aperture plate 104 is arranged in front of and adjacent to the film plane P—P and a film backing plate 106 is mounted just behind the film plane. The aperture plate 104 is provided with an upper picture aperture 108 and a lower picture aperture 110. In the embodiment of the invention shown, these apertures have dimensions suitable for the making of pictures on 35 mm. film. As indicated in FIG. 2, the upper and lower edges of the picture apertures 108 and 110 are parallel and horizontal while corresponding sides are collinear, one picture aperture 108 lying above the other 110.

For convenience in definition, the normal or average interframe distance is defined as the average distance between centers of successive frames when the frames are uniformly spaced along the film strip, irrespective of whether the images are uniformly spaced along the film. Stated differently, the normal interframe distance is one-half the average distance between successive frames that represent the same view. The term normal interframe distance is introduced in order to take into account the possibility, as later explained, that certain advantages accrue from offsetting the left views and the right views slightly in opposite directions along the length of the film. In this connection, it is to be noted that the actual height of the frame as measured by the exposed portion of the film is slightly less than the normal interframe distance and small blank spaces of unexposed film normally exist between successive frames. In the embodiment of the invention illustrated in FIGS. 1, 2, 3, 4, 5, and 6, the centers of the image apertures 108 and 110 are spaced apart three times the normal interframe distance and the centers of successive images on the film are spaced apart by the normal interframe distance.

In this embodiment of the invention, the left views of the scene being photographed and the right views of the scene being photographed are photographed in alternate frames of the film with the frames of a corresponding pair of stereoscopic views being spaced apart by two frames of other non-corresponding views between them as indicated in FIG. 3. There, it will be noted, that with ten frames numbered consecutively as F1, F2 . . . , F10, the right and left views of the first exposure #1 are photographed in frames F1 and F4 respectively; those of the second exposure #2 are photographed in frames F3 and F6 respectively; those of the third exposure #3 are photographed in frames F5 and F8 respectively; and so on. It is clear that no double exposures occur and that the film is efficiently used.

In order to effect appropriate advancement of the film during the photographing, a film guide 112 in the form of an arcuate extension from the lower end of the aperture plate 104 is arranged concentrically with the axis X of rotation of the arms 122 of an intermittently operating film advancing mechanism 120. Each time these arms 122 rotate through a complete cycle, the claws 123 engage the film 102 and draw the film downwardly past the aperture plate by a distance equal to twice the distance between the centers of two frames, that is a distance equal to twice the normal interframe distance.

The film is advanced downwardly through the camera in the direction as indicated by the arrows A in FIGS. 1, 2 and 3. Portions of the film that are behind the apertures 108 and 110 are exposed simultaneously to right and left views of the scene being photographed by virtue of the operation of a pair of shutters 130 and 132 that are mounted in a vertical recess 134 in front of the aperture plate 104. The two shutters are operated in synchronism by means of a motor-diven train of gears 140 which also operate the film advancing mechanism 120. These shutters remain closed, cutting off the transmission of light to the film behind the picture apertures while the film is being advanced past the picture apertures, but are open for the short period of time that the claws 122 are withdrawn from the film leaving the film stationary. The gear train 140 also serves to draw the film 102 from the camera magazine 150 and return it thereto continuously during the photography. Thus, while the film advancing mechanism is in its position as shown in FIG. 1, the shutters are in their closed position, preventing light from reaching the film through the picture apertures, and the shutters are in their open position indicated in FIG. 2 while the film advancing mechanism 120 is in its inactive, or non-transporting, state in which the film is stationary opposite the picture apertures.

The lens assembly 20 that is employed for producing stereoscopic motion pictures in the illustrated embodiment of the invention comprises a light-tight cylindrical housing member 22 that telescopes with a cylindrical flange 24 that projects forwardly from the front wall of the housing 100. A pair of matched lenses 28 and 30 are mounted one above the other, their optical axes Y1 and Y2 respectively extending horizontally to the centers of the upper and lower picture apertures 108 and 110. The right and left views of the scene being photographed are projected through right and left prisms 40 and 50 respectively, the right view of the scene being projected through the upper lens 28 into the upper picture 108 and the left view of the scene being projected through the lower lens 30 into the lower picture aperture 110. Two synchronized, or interlocked, adjustable lens stops (not shown) of conventional design are arranged on the light paths, to control the amount of light reaching the film in accordance with principles that are well known in the art of photography.

The rear faces 41 and 51 of the two prisms 40 and 50 are coplanar, lying in a vertical plane parallel to the film plane. The front faces 42 and 52 are also coplanar lying in a second vertical plane also parallel to the film plane. As indicated in FIGS. 4 and 5, each of the two prisms 40 and 50 have optical axes ZR and ZL respectively. The central portion ZCR of the optical axis of the right prism 40 is parallel to the front and rear faces 41 and 42 thereof. The central portion ZCL of the optical axis ZR of the prism 50 is parallel to the front and rear faces 51 and 52 thereof. The front and rear portions ZFR and ZRR of the optical axis of the right prism are perpendicular to the central portion ZCR and to the front and rear faces 41 and 42 of the right prism. Likewise the front and rear portions ZFL and ZRL of the optical axis ZL of the left prism are perpendicular to the central portion ZCL and to the front and rear faces 51 and 52 respectively of the left prism 50. The rear portion ZRR of the optical axis of the right prism coincides with the optical axis Y1 of the upper lens 28. Similarly, the rear portion ZRL of the optical axis of the left prism coincides with the optical axis Y2 of the lower lens.

The front portions ZFR and ZFL of the optional axes of the two prisms are spaced apart by a distance approximately equal to the interocular distance of a pair of human eyes, that is, they are about 2.5 in. or some other suitable fixed distance apart. These portions ZFR and ZFL of the optical axes of the prisms are symmetrically located on opposite sides of the plane of symmetry Z–Z and lie in a common horizontal plane. A right plane RPR of the right prism 40 includes the optical axis of the right prism 40 including the rear portion ZRR, the central portion ZCR and the front portion ZFR. A right plane RPL of the left prism 50 includes the optical axis of the left prism 50 including the rear portion ZRL, the central portion ZCL, and the front portion ZFL.

Each of the prisms includes two reflecting surfaces arranged at an angle of 45° with respect to the rear and front faces thereof respectively. The two internal totally reflecting surfaces of each prism are parallel. The first face in which light from the scene being photographed is reflected is called the first reflecting surface. The next reflecting surface to which light is reflected therefrom and thence to the lens is called the second reflecting surface. Thus, as indicated in FIG. 5, light entering the right prism 40 enters the front face 42 and is reflected by the first reflecting surface R1R to the second reflecting surface R2R and thence to the upper lens 28. Similarly, light entering the left prism 40 enters the front face 52 and is reflected by the first reflecting surface R1L to the second reflecting surface R2L and thence to the lower lens 30.

In order to control the focus of the lenses, the lens assembly 20 is moved inwardly and outwardly with the housing by means of a rack and pinion assembly 70, or other focusing mechanism to bring the views of the scene into focus at the film plane P—P. A wing or fin 71 extending from the tubular housing 22 rides in a slot 72 in order to maintain the alignment of the lens and prism assembly 20 during focusing. It will be noted that the upper lens 28 is mounted in a barrel 29 and the lower lens 30 is mounted in a barrel 31 and that each of these barrels is threadably attached to the lens housing 22. With this arrangement, either lens may be moved along its own axis relative to the other in order to make sure that the two lenses bring the right and left views of the scene into focus simultaneously in the film plane P—P.

During the photography a right-view image of the scene is formed at the upper aperture 108 by the light transmitted through the right prism 40 and the upper lens 28 and a left-view image of the scene is formed at the lower aperture 110 by the light transmitted through the left prism 50 and the lower lens 30.

During the photography, the film is alternately advanced and exposed, the film being exposed to a right-view image and a left-view image of the scene simultaneously. As a result, a film is produced in which one set of alternate frames represents a sequence of left views and a second set of alternate frames represents right views and in which the left view and the right view to which the film are simultaneously exposed are spaced apart by two frames as indicated in FIG. 3. Thus, where successive frames are numbers F1, F2, F3 . . . , F10 as indicated in FIG. 3, the right and left views seen at time #1 appear at frames F1 and F4 while the right and left views seen at time #2 appear at frames F3 and F6, the right and left views seen at time #3 appear at frames F5 and F8, etc.

After the motion picture has been photographed in accordance with this invention, it may be projected by a suitable projection system such as that illustrated schematically in FIG. 7. Here, the film 202 is intermittently advanced a uniform amount equal to twice the normal interframe distance between a projection aperture plate 204 and a backing plate 206 which is located between a pair of incandescent lamps, xenon arc lights, or other light sources 210 and 212 and a pair of projection lenses 220 and 222 adjusted to focus the right and left views on the screen with corresponding image points substantially at the same height and appropriately spaced horizontally for comfortable viewing. These lenses project images of the positive film through polarizing plates 230 and 232 onto a non-depolarizing viewing screen. The two beams are projected with light that is polarized in planes that are at right angles to each other and the projected images are viewed by spectators wearing spectacles that have polarizing elements that are polarized at right angles to each other in a manner well known in the art. Thus, with this arrangement, a stereoscopic view of the original scene is obtained.

In order to be sure that the right view is presented to the right eye and the left view is presented to the left eye, means are provided for producing registration marks M opposite images of one view, say the left view, at a location along one line of the sprocket holes on the film. Such registration marks may be readily formed by projecting light from a lamp 150 through a lens 152 toward a mirror 154 which reflects the light past the path of the shutter through a small aperture 160 in the housing and a small aperture 162 in the aperture plate onto a small spot on the film adjacent the center of one of the frames which is not being exposed at that time to views of the scene being photographed. Such registration marks M are employed by the projectionist during the course of threading the positive film 202 into the projector in order to be sure that the photographs of the right and left views respectively are projected through the appropriate plates 230 and 232 of polarizing material in order to present the right views of the screen to the right eyes of the spectators and the left views of the scene to the left eyes of the spectators.

To facilitate an optical match of the two prisms and for other purposes indicated hereinafter, the two prisms are cut from a single rhomboidal block as illustrated in FIG. 8. The block is first prepared by accurately optically grinding the faces that correspond to the front and rear faces 41, 51, 42 and 52 and reflecting faces R1R, R1L, R2R and R2L of the prisms. Thus, the upper and lower faces are ground parallel and two other faces that are parallel to each other and lie at an angle of 45° with respect to the first two mentioned faces, are ground optically parallel. Then the block is cut along right sections to form the two matched prisms. Thereafter, pyramidal sections 45 and 55 are cut therefrom at suitable angles as described below.

The angle and size of the prism blocks and the removed pyramidal sections depend upon and are determined by geometrical factors such as the size of the frames of the film and the spacing of the picture apertures and the interocular distance employed. Thus, it will be noted by comparing FIG. 8 which represents prisms suitable for use in a 35 mm. camera and FIG. 10 which represents prisms suitable for use with a 16 mm. camera, entirely different pyramidal cuts are employed.

The two prisms are then positioned, as previously indicated, in a suitable mounting in order to locate the rear portions of their respective optical axes in one plane and to locate the front portions ZFR and ZFL of their optical axes in a plane parallel to the first mentioned plane. In order to provide a single unit and for other purposes, the pyramidal portions 45 and 55 are cut so that the contiguous surfaces of the prisms may be cemented to opposite sides of a supporting septum CP as indicated in FIG. 4.

With prisms so cut, the areas of the front faces of the prisms are larger than the areas of the rear faces of the prisms, thus adapting the front face and the rear face of each prism to more efficiently accommodate a conical beam of light transmitted through the prism into the corresponding aperture without prohibitive vignetting being introduced by either face of the prism alone.

In a practical embodiment of this invention, non-reflecting light-absorbing masking is introduced at the rear faces 41 and 51 of the prisms and additional masking is introduced along the faces of the reflecting surfaces R1R, R1L, R2R and R2L to absorb light that is not reflected in the intended manner once at the first reflecting surface R1R and once at the second reflecting surface R2R. Such masking may be in the form of a coating formed by depositing on the appropriate surfaces black lacquer that has about the same index of refraction as the glass of which the prism is composed.

It is thus seen that I have provided an improved stereoscopic motion picture camera in which the right and left views of a scene are printed alternately in alternate frames on a strip of film and in which the right and left views that are seen simultaneously are spaced apart by a distance corresponding to two frames, and that with this arrangement a wide space is provided between the camera apertures corresponding to the two views in order to accommodate lens mounts and other mechanical and optical parts needed to complete a practical working camera.

If larger working space is needed to accommodate the optical and mechanical parts of the camera, the apertures may be located four frames or six frames apart. But for most efficient film usage, the film is still advanced by only two frames between exposures in order to achieve the desired photographic results. More generally, the picture apertures may be located any even number (other than zero) frames apart while retaining many of the advantages of this invention.

Of course it is not necessary that the entire strip of film that extends from the upper aperture 108 to the lower aperture 110 be in a fixed geometrical plane. For example, the portion of the film that is located between the apertures 108 and 110 could follow a curved path in that region. However, for simplicity in definition, some of the claims specify that the apertures are spaced an even number of frames apart, it being understood that the apertures are not contiguous but are spaced apart a substantial distance and that a path followed by the film is of such a character that simultaneously exposed frames are spaced apart on the film by a distance corresponding to an even number of frames.

An alternate and superior arrangement for coding the pictures photographed to indicate whether or not they are properly registered in projection, is explained in connection with FIGS. 11 and 12. In this case the prisms 40 and 50 and lenses 28 and 30 are arranged to offset the right image upwardly from its center as indicated in FIG. 4 and the left image downwardly from its center as indicated in FIG. 4 and the apertures 108 and 110 are likewise offset vertically. To achieve this arrangement the faces of the prisms are cut slightly differently from those previously described. Where the prisms are cut from the same block as previously, the desired results are achieved by displacing the front axes ZFR and ZFL of the prisms inwardly horizontally a slight amount and displacing the lenses 28 and 30 and the rear axes ZRR and ZRL outwardly along a vertical line. The directions of displacement of the axes from the positions they have in the device illustrated in FIG. 4 are illustrated in FIG. 12.

In FIG. 11 there is illustrated a series of right and left views that indicate how the offset of the axes of this modified system affects the spacing of the right and left views on the film strip. Referring to FIG. 11 it will be noted there that all of the left images have been displaced downwardly while all the right images have been displaced upwardly from the positions that they had in FIG. 3. While the spacing between successive left images is constant and while the spacing between successive right images is constant and while the constant spacings in the two sets of images are equal, the distance between adjacent right and left views are no longer equal. With this arrangement once a projector has been set to properly project a picture, then if for any reason a new film is placed in the projector with the right and left views interchanged, the two views will not be superimposed on the screen. Instead, the two views will overlap, leaving a margin at the top and bottom of the screen in which only one of the views can be seen. This error will be so obvious that immediate correction can be made. Films with views recorded thereon as in FIGS. 3 and 12 are described and claimed in my Patent No. 3,339,998.

Satisfactory results can be obtained by displacing the center of each frame from its normal position shown in FIG. 1 by a distance of about 5% of the normal interframe distance for a frame height of 0.560″. This amounts to a displacement of each of the frames of 0.028″.

When each picture aperture is offset as described by a distance equal to a few percent, say between about 1% to about 10% of the normal interframe distance, then there is between 4% and 40% failure of overlap in projected images if they are not properly registered in a projector that has been previously correctly aligned for satisfactory projection.

It will be noted that in both the film of FIG. 12 and in the film of FIG. 3, corresponding points of successive left views are spaced apart twice the normal interframe distance. Likewise the corresponding points of successive right views are spaced apart twice the normal interframe distance. In the film of FIG. 3, the centers of successive frames are spaced apart by the normal interframe distance. However, in the film of FIG. 12, the spacing between adjacent right and left views on the film is alternately greater than and less than the normal interframe distance.

When employing the arrangement that produces the asymmetrical image location illustrated in FIG. 12, it is not necessary to place registration marks on the edge of the film as with the mechanism of FIG. 2. Thus, not only does the offsetting of the apertures slightly from an integral multiple of the interframe distance provide a simple keying or registration technique, but it makes possible the elimination of the auxiliary equipment otherwise needed for placing registration marks on the film.

While the invention has been described with reference to a motion picture camera, it will be understood that it may also be applied to still photography. It will, of course, be understood that while the invention has been described in a definite geometric form, deviations therefrom will not render the invention inoperative. Therefore, it will be understood that where reference is made to perpendicularity, parallelism, coplanar, and the like, in practice the conditions need not be geometrically exact in order to utilize the invention. As used herein, the terms "right plane" and "right section" refer to planes and sections respectively that are perpendicular to the edges at the corners of the rhomboidal cross-sections of the prisms.

While the invention has been described with respect to the normal mounting of the camera in which the film is moved vertically, and in which the front faces of the prism are displaced from each other horizontally, it will be understood that the camera may be employed in many other orientations and that therefore the terms "vertical" and "horizontal" as used in the claims are to be construed relative to each other and are not restricted by a reference to a plumb line.

Furthermore, while the invention has been described in reference to a pair of rhomboidal prisms, it may be embodied in other forms making use of other types of optical means for transmitting horizontally displaced right and left views of a scene to corresponding vertically displaced image apertures. Thus, for example, instead of employing prisms, use may be made of mirrors. In some cases advantages may also be taken of fiber optics. In addition, the invention may be modified in many ways by employing other types of lens and camera mechanisms than those mentioned.

Broadly speaking, the invention resides primarily in an improved camera for photographing right and left views of a scene on two vertically separated frames of a single vertically extending strip of film with the frames on which the views are photographed being separated by an even number of frames. At the present time, a separation of two frames or four frames is believed to be best, although a greater separation may be more suitable if the frames themselves are very small such as those utilized in 8 mm. motion picture photography.

It will also be understood that the various optical parts may be arranged differently from those shown and more particularly that the lenses need not be located between the reflecting means and the film apertures, but may be located in front of the reflecting means. In case reflecting mirrors are employed instead of rhomboidal prisms each lens may even be located between the reflecting surfaces that transmit light from one view of the scene to a corresponding aperture.

In view of the foregoing, it will be understood that the invention may be embodied in many other forms within the scope of the appended claims.

The invention claimed is:
1. In a stereoscopic camera:
    means defining a pair of picture apertures of equal size corresponding to the size of a frame, said picture apertures being spaced apart vertically with their horizontal edges parallel and their corresponding vertical edges collinear, the apertures being located in a common vertical plane, the spacing between said apertures being approximately an even number of frames, the distance between centers of said apertures differing from $(2n+1)$ times the normal interframe distance by a few percent of the normal interframe distance where $n$ is an integer equal to 1 or greater;
    a pair of image forming means for receiving light from a scene to be photographed along a pair of axes that are separated from each other horizontally by a predetermined distance, and for transmitting that light as right-view and left-view images of the scene to respective picture apertures;
    an intermittently operating mechanism for periodically moving a film past said apertures by a distance equal to twice the normal interframe distance.
2. In a stereoscopic camera as defined in claim 1 wherein:
    each of said image forming means comprises a lens and at least two reflecting surfaces, a first pair of the reflecting surfaces of the respective means being offset horizontally and a second pair of said reflecting surfaces being offset vertically, the light transmitting portions of the reflecting surfaces having cross-sectional areas having projections onto planes that lie transverse to said respective axes that are substantially larger than said frames, said cross-sectional areas of the reflecting surfaces that are spaced apart vertically substantially overlapping the space between said two apertures; and
    shutter means for simultaneously exposing film behind said respective apertures to said right-view and said left-view images respectively.
3. A motion picture camera as defined in claim 2, comprising a film advancing means for intermittently advancing film vertically along said film plane by a distance equal to two frames at a time, and shutter means for exposing said film in said apertures while the film is stationary behind said apertures.
4. A stereoscopic camera as defined in claim 2, wherein said even number equals two and wherein the spacing between the shutters of the frames in which corresponding right- and left-view images are photographed is approximately equal to the normal interocular distance of man.
5. In a stereoscopic camera as defined in claim 1 wherein said image forming means comprises:
    a pair of prism means, and a pair of lens means associated respectively with said pair of prism means for respectively forming in said picture apertures a right-view and a left-view respectively of a scene being photographed,
    each said prism means having front and rear faces, the rear faces of the two prism means being located in the same vertical plane opposite the respective pair of picture apertures, the front faces of the respective prism means being located in a common vertical plane and horizontally offset equal distances from a plane of symmetry that is vertical and that intersects said vertical film plane at the centers of said apertures, each of said prism means comprising a pair of mutually parallel internally reflecting surfaces, the first and second reflecting surfaces of each said prism means being inclined at an angle of 45° with respect to the front face and rear face respectively of said each prism means, each prism means having an optical axis along which radiation is received from an object field in front of its front face and along which such radiation is reflected internally by said first and second reflecting surfaces in turn and along which the radiation is then in turn projected through said rear face to the corresponding picture aperture, the thickness of each prism means in a vertical direction being about three times the normal interframe distance, the portions of the optical axes of the respective prism means that extend through said front faces lying in a common horizontal plane.
6. A camera as defined in claim 5 wherein said prisms are in the form of rhomboids that have two adjacent surfaces rigidly secured together.

References Cited

UNITED STATES PATENTS

| 1,559,893 | 11/1925 | Lane et al. | 352—60 |
| 2,013,842 | 9/1935 | Savage | 352—57 |
| 2,991,690 | 7/1961 | Grey et al. | 88—1 |

FOREIGN PATENTS

| 810,592 | 12/1936 | France. |
| 810,769 | 1/1937 | France. |

JULIA E. COINER, *Primary Examiner.*